No. 689,867. Patented Dec. 31, 1901.
J. R. FLEMING.
CAR AXLE AND BOX.
(Application filed Nov. 19, 1900.)
(No Model.)
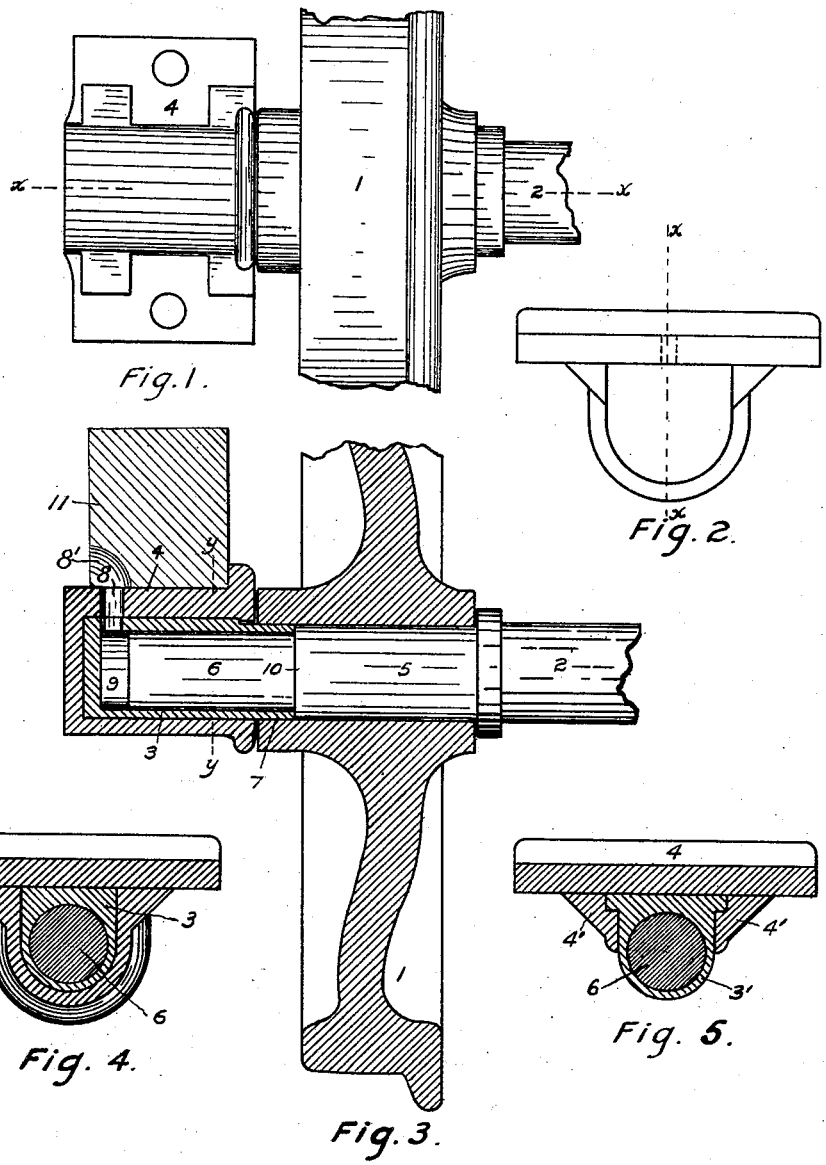
WITNESSES:
Geo. G. Blatt.
D. G. Moran
INVENTOR,
James R. Fleming
BY D. B. Replogle
ATTORNEY

UNITED STATES PATENT OFFICE.

JAMES R. FLEMING, OF SCRANTON, PENNSYLVANIA.

CAR-AXLE AND BOX.

SPECIFICATION forming part of Letters Patent No. 689,867, dated December 31, 1901.

Application filed November 19, 1900. Serial No. 36,933. (No model.)

*To all whom it may concern:*

Be it known that I, JAMES R. FLEMING, a citizen of the United States, residing at Scranton, in the county of Lackawanna and State of Pennsylvania, have invented certain new and useful Improvements in Car-Axles and Boxes, of which the following is a specification, reference being had therein to the accompanying drawings.

This invention relates to improvements in the axle and bearings of cars such as are usually in use about mines; and the objects of the invention are to increase the facility of proper lubrication of said car-axle, to simplify their construction, and to prevent the entrance of dirt and grit into the lubricated parts.

To these ends my invention consists of the construction, arrangement, and combination of the several parts herein fully set forth, and specially pointed out in the claims.

In the drawings, Figure 1 is a view of parts of a car axle and wheel, taken in connection with an under side view of my car-axle bearing-box. Fig. 2 is an outer end view of the bearing-box. Fig. 3 is a view, partly in cross-section, taken on the line *x x* of Figs 1 and 2. Fig. 4 is a view in cross-section, taken on the line *y y* of Fig. 3. Fig. 5 is a similar view in cross-section of a modified form for the bearing-box.

Similar characters of reference denote like and corresponding parts throughout the several views.

In the drawings, 1 designates a car-wheel mounted to revolve on the axle 2, the axle also being revoluble in the bearing 3, which bearing is included or incased in the bracket 4, which is adapted to be bolted to the timber 11 of the car with which it is to be used. The spindle on the axle is constructed in two sections, the larger part (designated 5) being wholly within the bore of the car-wheel and the smaller part, 6, extending into the bearing 3. The bearing proper, as shown in the drawings, is provided with a flattened side upward, and the bracket is provided with an opening corresponding in cross-section with it to keep it from revolving. A flanged portion 7 of the bearing 3 is reduced to such size as to fit into that part of the bore of the wheel 1 which extends beyond the section 5 of the spindle when the wheel is mounted thereon, just filling the annular space within the said bore and around the smaller section 6 of the spindle. An oil-passage 8, leading to the open space 9 within the bearing 3, is constructed by a bore-hole extending downward through the bracket 4 and upper wall of the bearing 3. Access is had to the oil-passage 8 through the recess 8', cut into the timber 11.

In the operation of the device the open space 9 is filled with oil or other lubricating substance, which finds its way along the spindle 6 to the shoulder 10, where it follows the joint between the inner reduced end of the bearing 3 until it comes in contact with the inner surface of the bore of the car-wheel. Thence it finds its way along the surface of section 5 of the spindle, thus fully lubricating both the smaller and larger sections of the spindle.

In the substitute form of the device the bearing 3' is adapted to be held to the bracket 4 by means of lugs or sliding ways 4' 4'. In this construction the end closure and bottom part of the bracket 4 are omitted, so that the bearing 3' may be slid lengthwise off the end of the spindle and the bracket then lifted straight upward in dismantling the car, so as to obviate the necessity of unbolting the bracket 4 when dismantling.

Many other of the details of the construction may be varied without departing from the general spirit of my improvement.

Although the drawings in the present application show a sliding and removable axle-bearing box, it is not my intention in this application to claim invention of the said device, for the reason that I have claimed invention on the sliding box as shown in an application, Serial No. 34,523, filed October 26, 1900, in the United States Patent Office.

What I do claim, and desire to secure by Letters Patent, is—

1. The combination of a car-axle spindle having its end reduced, a wheel mounted on the larger part thereof, the said larger part of the spindle extending partially through the bore of the wheel, and a bearing fitted to the reduced end of said axle, said bearing having a flange extending into the bore of the wheel and abutting against the shoulder of the larger part of the spindle, substantially as specified.

2. The combination of a car-axle having a spindle consisting of an inner or larger section and an outer or smaller section, a car-wheel having a bore corresponding in diameter to the larger section, but greater in length, a bearing fitted to the said outer section of the spindle having an annular flange adapted to abut against a shoulder of the larger section within the bore of the wheel as specified.

In testimony whereof I affix my signature in presence of two witnesses.

JAMES R. FLEMING.

Witnesses:
   D. G. MORAN,
   C. M. FLOREY.